United States Patent [19]
Wright et al.

[11] 4,261,758
[45] Apr. 14, 1981

[54] ROOM TEMPERATURE VULCANIZABLE SILICONE RUBBER COMPOSITIONS WITH SAG-CONTROL

[75] Inventors: John H. Wright, Clifton Park; Warren R. Lampe; Alfred H. Smith, Jr., both of Ballston Lake, all of N.Y.

[73] Assignee: General Electric Company, Waterford, N.Y.

[21] Appl. No.: 34,212

[22] Filed: Apr. 30, 1979

Related U.S. Application Data

[63] Continuation-in-part of Ser. No. 455, Jan. 2, 1979, abandoned.

[51] Int. Cl.³ .............................................. C08G 77/04
[52] U.S. Cl. ........................... 106/287.12; 106/287.14; 260/18 S; 260/37 SB; 260/33.4 SB; 260/31.4 R; 260/31.6; 260/31.8 S; 260/29.1 SB; 260/21.2 R; 260/33.2 R; 427/387; 427/391; 427/392; 427/388.1; 427/389.9; 428/446; 428/447; 428/450; 428/452
[58] Field of Search .......... 260/18 S, 37 SB, 33.4 SB, 260/31.4 R, 31.6, 31.8 S, 29.1 SB, 33.2, 31.2; 106/287.12, 287.14; 427/387, 388 R, 390 R, 391, 392; 428/446, 447, 450, 452

[56] References Cited
U.S. PATENT DOCUMENTS

| 3,350,344 | 10/1967 | Beers | 260/37 |
|---|---|---|---|
| 3,382,205 | 5/1968 | Beers | 260/37 |
| 3,438,930 | 4/1969 | Beers | 260/37 |
| 3,541,044 | 11/1970 | Beers et al. | 260/37 |
| 3,661,817 | 5/1972 | Hamilton et al. | 260/18 S |
| 3,700,714 | 10/1972 | Hamilton et al. | 260/448.2 B |
| 3,708,467 | 1/1973 | Smith, Jr. et al. | 260/18 S |
| 3,714,089 | 1/1973 | Hamilton et al. | 260/18 S |
| 3,730,938 | 5/1973 | Smith, Jr. et al. | 260/37 SB |
| 3,837,878 | 9/1974 | Beers | 106/308 Q |
| 3,845,161 | 10/1974 | Beers | 260/825 |
| 3,847,848 | 11/1974 | Beers | 260/18 S |
| 3,888,815 | 6/1975 | Bessmer et al. | 260/37 SB |
| 3,960,802 | 6/1976 | Beers et al. | 260/37 SB |
| 3,962,160 | 6/1976 | Beers et al. | 260/18 S |
| 4,052,331 | 10/1977 | Dumoulin | 260/18 S |
| 4,100,129 | 7/1978 | Beers | 260/37 SB |
| 4,102,852 | 7/1978 | De La Torre et al. | 260/37 SB |

Primary Examiner—Melvyn I. Marquis
Attorney, Agent, or Firm—E. Philip Koltos; John L. Young; Philip L. Schlamp

[57] ABSTRACT

A room temperature vulcanizable silicone rubber composition with sag-control wherein the base material or mixture of ingredients for forming the composition comprises a silanol end-stopped diorganopolysiloxane polymer, at least 3 parts of a fumed silica filler and as the sag-control ingredient, from 0.03 to 2.0 parts of a polyether. As a work-like extending additive in the case of a two-part room temperature vulcanizable silicone rubber composition, there may be added to the basic ingredients of the composition a low viscosity silanol end-stopped polysiloxane.

40 Claims, No Drawings

ROOM TEMPERATURE VULCANIZABLE SILICONE RUBBER COMPOSITIONS WITH SAG-CONTROL

BACKGROUND OF THE INVENTION

This application is a continuation-in-part of Ser. No. 455 filed on Jan. 2, 1979 and now abandoned.

The present invention relates to room temperature vulcanizable silicone rubber compositions and more particularly the present invention relates to novel room temperature vulcanizable silicone rubber compositions which have sag control.

The present invention relates also to a two-component room temperature vulcanizable silicone rubber compositions having the foregoing sag-control additive and also having therein a work-life extending additive.

Room temperature vulcanizable silicone rubber compositions or RTV compositions, as they will be hereinafter referred to, are well-known. The one-component RTV compositions generally comprise as the basic ingredients, a silanol end-stopped linear diorganopolysiloxane polymer, a filler, methyl triacyloxy silane as the crosslinking agent and the metal salt of a carboxylic acid as the catalyst. Such a mixture of ingredients is prepared and mixed in the anhydrous state and then when it is desired to use the composition it is applied from the water-proof package in which it is packaged and exposed to atmospheric moisture whereupon the composition cures to a silicone elastomer.

Another type of one-component RTV composition comprises as its basic ingredients a silanol end-stopped diorganopolysiloxane polymer, a filler, methyltrialkoxy silane as the crosslinking agent and a titanium chelate as a catalyst. See for instance the disclosure of Beers U.S. Pat. No. 4,100,129, which is incorporated into the present use by reference.

In the same fashion as the previous one-component system, such alkoxy functional systems are packaged in the anhydrous state and stored as such. When it is desired to cure the composition, the composition is taken from the water-proof package and exposed to atmospheric moisture whereupon it cures to a silicone elastomer. The advantage of the latter one-component RTV system over the previous system is that it has desirable low modulus so that it can be used with advantage as a construction sealant.

In the same manner two-component RTV systems are well-known. Such two-component RTV systems generally comprise as the basic ingredients a silanol end-stopped diorganopolysiloxane polymer and a filler which is generally packaged as a separate package and then to form a second package there is utilized an alkyl silicate crosslinking agent which is mixed with a metal salt of a carboxylic acid. The compositions prepared in these two packages are stored as such and when it is desired to cure the composition, the two packages are mixed together either in the presence or absence of moisture and cure to form a silicone elastomer. An example of such a two-part RTV composition is for instance to be found in the disclosure of Bessemer and Lampe U.S. Pat. No. 3,888,815. Other well-known ingredients may be incorporated into these compositions, for instance, flame-retardant additives, heat resistance additives, reversion resistance additives and soforth.

One of the important additives that is added to such compositions is an additive that results in the composition being self-leveling or one with sag-control. A self-leveling composition is an RTV composition which when applied in the uncured state will flow. For potting compositions and other such uses such self-leveling compositions are preferred. However, when the RTV composition is to be utilized as a sealant and more specifically as an industrial or construction sealant, then it is desired that the composition have sag-control. By sag-control it is meant that the composition in the uncured state is extrudable and flowable but when pressure is not applied to it, other than the forces of gravity, it will stay in the place it is put to in the uncured state without flowing. Thus, if an RTV composition has sag-control, it can be applied as a sealant in overhead crevices and wall crevices and will remain there in the uncured state until it cures to a silicone elastomer without flowing out of the creive. Accordingly, it can be seen that sag-control is an important property for silicone sealants, as well as other types of sealants.

In the past, various types of sag-control additives have been utilized for RTV compositions. For instance, for aminoxy curing functional RTV systems there have been utilized a combination of water and a humectant such as for instance glycerol, to make an aminoxy functional RTV system have sag-control as disclosed in the foregoing patent, is not effective with a silanol functional RTV system, that is an RTV system in which the basic ingredient is a silanol-terminated linear diorganopolysiloxane polymer. Another one-part RTV system uses a phenyl containing polysiloxane fluid with high trifunctionality as disclosed in the foregoing Beers' U.S. Pat. No. 4,100,129. While such a high phenyl-containing polysiloxane fluid with high trifunctionality is effective as a sag-control agent in combination with fumed silica in the composition, nevertheless, it is not effective as is desired and it is also expensive.

Another sag-control agent that has been used in two-part RTV systems having as the base ingredient a silanol-terminated diorganopolysiloxane polymer is hydrogenated castor oil. However, such hydrogenated castor oil while effective in two-part RTV systems, when it is placed in one-component RTV systems results in the one-component systems having no shelf-life, that is they cure up almost immediately in the absence of moisture to a silicone elastomer or at least form a gel phase, which makes the composition unflowable. Finally, the most effective method, at least in one-component RTV systems for maintaining sag-control in the system, is to incorporate into such compositions per 100 parts of the base silanol end-stopped diorganopolysiloxane polymer, at least 11 to 14 parts of treated fumed silica filler by itself or with other sag-control additives, such as the high phenyl trifunctional silicone fluids disclosed previously. While such a method gives effective sag-control, nevertheless, it suffers from two aspects. In one aspect treated fumed silica which is utilized in such compositions to impart sag-control to the composition is expensive and results in additional expense in the formation of the composition. However, more importantly, if it is desired to make a low modulus one-component or two-component RTV sealant it is necessary to keep the concentration of the fumed silica as low as possible. The presence of fumed silica, whether treated or untreated increases the modulus of the cured silicone elastomer formed from the composition. Accordingly, it is highly desirable to utilize as low an amount of fumed silica or specifically treated fumed silica in such one-component RTV compositions or two-component RTV compositions when it is desired to produce a low modulus RTV construction sealant. A low modulus RTV sealant is especially preferred for RTV construction sealants since the lower the modulus the higher the elasticity of the sealant in the cured state and the more it allows movement of adjoining surfaces which have been sealed without the sealant rupturing. Accordingly, it was highly desirable to find a sag-control additive that could be added to one-component and two-component RTV systems which would make the systems have effective sag-control with a minimum of fumed silica in the composition.

When the two-component room temperature vulcanizable silicone rubber composition is utilized to adhere two panes of glass to each other by applying the composition around the edges of the panes as a sealant so as to produce insulated glass partitions, it is desired that the composition have sag-control so that is will stay where it is placed without dripping or pouring out of its location. However, it is also important in that the composition have a work-life from 45 minutes to one hour or more. This is necessary since this amount of work-life is necessary for the two-components to be mixed and metered to where the mixed composition is applied to the window panes, which are to be adhered together. It has been found that traditional two-component room temperature vulcanizable silicone rubber compositions when stored separately, that is when the components are stored separately for periods of time of six months to a year or more, that in such compositions the work-life decreases by a factor of as much as six times or more. Accordingly, it was highly desirable to find a work-life extender for such compositions such that the work-life of such compositions would still be at an acceptable level, even after the compositions have been stored separately prior to mixing for periods of six months to a year or more.

It is one object of the present invention to provide for a one-component or two-component RTV composition with an inexpensive, effective and efficient sag-control additive.

It is an additional object of the present invention to provide for a one-component and two-component RTV compositions.

It is still an additional object of the present invention to provide for a one-component or two-component RTV composition which has a low modulus and utilizes a minimum of fumed silica in the composition and has effective sag-control through the use of a cheap and inexpensive sag-control additive.

It is also another object of the present invention to provide for a process for producing a low modulus one-component or two-component RTV system with effective sag-control.

It is yet still an additional object to the present invention to provide for a two-component room temperature vulcanizable silicone rubber compositions with effective sag-control, a low modulus and a suitable worklife even after the composition has been stored for periods of time of six months to a year or more at room temperature or at elevated temperatures.

These and other objects of the present invention are accomplished by means of the disclosure set forth herein below.

SUMMARY OF THE INVENTION

In accordance with the above object, there is provided by the present invention a base material for forming a room temperature vulcanizable silicone rubber composition which has sag-control comprising (A) 100 parts by weight of a silanol end-stopped diorganopolysiloxane polymer of a viscosity varying from 500 to 1,000,000 centipoise at 25° C. where the organo groups are monovalent hydrocarbon radicals; (B) at least 3 parts of fumed silica which may be treated or untreated; (C) from 0.03 to 2.0 parts by weight of polyether selected from the formula,

$$A-O-(C_xH_{2x}O)_n-B \quad (1)$$

and

$$(A-O-(C_xH_{2x}O)_n-)_y(Q)_z \quad (2)$$

wherein A and B represent radicals selected from the class consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms and

$$R-\overset{\overset{O}{\|}}{C}-O$$

wherein R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; n is a number having a value of from 4 to 2,000; x is a number having a value of 2 to 4; y has a value of from 2 to 10; and z has a value of from 1 to 5; the polyether having a molecular weight of from about 300 to about 200,000.

With such a base ingredient which may be utilized either in a one-component system or two-component system, there may be utilized an acyloxy functional silane as a cross-linking agent to provide a acyloxy functional one-part RTV system or there may be utilized an alkoxy functional one-component RTV system. With the above base mixture of ingredients there may be also utilized as the second-component an alkyl silicate or a partial hydrolysis product of an alkyl silicate and a metal salt of a carboxylic acid as the catalyst. Thus, when these two components are mixed there is formed a silicone elastomer either in the presence or absence of water.

There is preferably added to the two component room temperature vulcanizable silicone rubber compositions such as described above, a low molecular weight silanol terminated diorganopolysiloxane polymer as a work-life extender. Thus, in the most preferred embodiment by the adding of such low molecular weight silanol terminated diorganopolysiloxane polymer to the composition, the composition has a work-life that is extended by a factor of three times or more. There is preferably added from 0.13 to 1 part of such low molecular weight silanol terminated fluid, to 100 parts of the silanol terminated base polymer. The low molecular weight terminated fluid is preferably a linear silanol terminated diorganopolysiloxane polymer of a viscosity varying from 5 to 1,000 centipoise at 25° C. and more preferably of a viscosity varying from 5 to 500 centipoise at 25° C. and most preferably of a viscosity varying from 5 to 50 centipoise at 25° C. where the organo groups are selected from any monovalent hydrocarbon radicals and are most preferably methyl.

It should be understood that preferably there is utilized anywhere from 4 to 28 parts of a fumed silica, which is treated with a cyclicsiloxane such as cyclopolysiloxanes and silazanes. In addition to the treated fumed silica there may be present a non-reinforcing extending filler such as lithopone. It should be understood that it is desired to maintain the minimum amount of treated fumed silica in the instant composition such as 3 to 4 parts if it is desired to obtain a low modulus RTV composition.

DESCRIPTION OF THE PREFERRED EMBODIMENT

The basic composition of the instant case comprises a basic mixture of ingredients which can be used with various types of silanol curing room temperature vulcanizable silicone rubber compositions both one-part and two-part. As the basic ingredient of such composition there comprises 100 parts by weight of a silanol end-stopped diorganopolysiloxane polymer of a viscosity varying from 500 to 10,000,000 centipoise at 25° C. and more preferably of a viscosity varying from 500 to 1,000,000 centipoise at 25° C. where the organo groups are monovalent hydrocarbon radicals. Preferably such silanol polymer is a linear polymer where the organo groups can be any monovalent hydrocarbon group, but are more preferably selected from alkyl radicals of 1 to 8 carbon atoms; mononuclear aryl radicals such as phenyl, methylphenyl, ethylphenyl; alkenyl radicals, such as vinyl, allyl and soforth; cycloalkyl radicals such as cyclohexyl, cycloheptyl; and halogenated monovalent hydrocarbon radicals such as 3,3,3-trifluoropropyl. Most preferably such silanol end-stopped polymer is one having the formula,

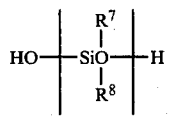

(3)

where $R^7$ and $R^8$ are independently selected from alkyl radicals, alkenyl radicals, cycloalkyl radicals, mononuclear aryl radicals and halogenated alkyl radicals of 1 to 8 carbon atoms, such as the radicals given above for the organo groups of the silanol end-stopped diorganopolysiloxane polymer as broadly defined above.

In the above formula, t varies such that the polymer has a viscosity from anywhere from 500 to 10,000,000 centipoise at 25° C. and more preferably has a viscosity varying from 500 to 1,000,000 centipoise at 25° C.

The second and necessary ingredient in the composition is at least 3 parts of fumed silica to 100 parts by weight of the silanol end-stopped diorganopolysiloxane polymer of Formula (3) above.

A certain amount of silica filler is needed in the composition to give it strength, that is such that the cured silicone elastomer has strength. However, too much filler is undesirable since although it increases the tensile properties of the cured silicone elastomer, it detracts from the composition havig a low modulus. It should be noted that precipitated silica cannot be used in the instant basic composition to form one-component RTV's but may be utilized to form two-component RTV's.

Precipitated silica is not preferred as the basic filler in the basic mixture of ingredients of the compositions of the instant case for forming one-component RTV systems since it requires laborious heat and vacuum cycles to remove moisture.

Accordingly, in the basic mixture of ingredients in the composition of the instant case it is desired to have at least 3 parts of fumed silica which may be treated or untreated. In the case, when the fumed silica is untreated then it is generally preferred that there be present from 3 to 15 parts of the untreated fumed silica per 100 parts of the base silanol end-stopped diorganopolysiloxane polymer. It should be noted that the upper limit for the presence of fumed silica is given above as a guide to indicate the fact that this is the maximum amount of untreated fumed silica that can be tolerated in the composition without completely detracting away and eliminating low modulus properties in the cured silicone elastomer formed from the composition. In the case of treated fumed silica filler there is desired to be utilized from 4 to 28 parts by weight of the treated fumed silica filler per 100 parts by weight of the silanol end-stopped polymer and more preferably from 4 to 20 parts by weight.

Such fumed silica fillers are preferably treated with cyclicpolysiloxanes and most preferably treated with octamethyl cyclotetrsiloxanes to give the filler the desired surface characteristics, as disclosed in Lucas, U.S. Pat. No. 2,938,009. The fillers may also be treated in addition with silazanes as disclosed in Smith U.S. Pat. No. 3,635,743. Preferably the filler is treated with cyclotetrasiloxanes or any other cyclopolysiloxanes so as to impart the desired strength properties to the composition. It should be noted that the above concentrations of fillers is given as a guide, since the crosslinking agent in the various RTV systems varies, the amount of filler that will be desired to be used varies. However, in general it is desired to keep the amount of filler as close as possible to the minimum of 3 or 4 parts by weight that is disclosed to be the preferred lower limit since that will result in the one-component RTV system having as low a modulus as possible. Finally, in the base composition per 100 parts of the silanol end-stopped polymer, there is utilized from 0.03 to 2.0 parts by weight of polyether selected from Formula (1) and (2) as disclosed above. Such polyethers are well-known in art and are added to the composition to impart sag-control to the composition. If less than 0.03 parts by weight of the polyether is added to the composition, then the composition does not have sufficient sag-control. If more than 2.0 parts per 100 parts by weight of the silanol end-stopped polymer is added of the polyether then the flowability properties of the composition are somewhat impaired. Preferably there is utilized from 0.05 to 0.5 parts of the polyether per 100 parts of the silanol end-stopped diorganopolysiloxane polymer.

The polyethers which are used herein combination with the silanol end-stopped diorganopolysiloxane oils according to this invention are polymeric alkylene oxides and/or polymeric alkylene glycols, and may be represented as stated before by the following formulas:

(1)

and

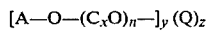

wherein A and B represent radicals selected from the class comprising hydrogen, alkyl radicals containing from 1 to 12 carbon atoms, cycloalkyl radicals containing 5 to 7 carbon atoms in the ring, mononuclear and binuclear aryl radicals and mononuclear aryl lower alky radicals wherein the alkyl groups attached to the aromatic nucleus contain a total of no more than 5 carbon atoms; A and B also represent ester forming groups containing from 2 to 12 carbon atoms; A and B may or may not be alike. When there is more than one A radical per molecule, the A radicals may or may not be the same. Q is a residue of a polyhydric initiator radical containing at least two hydroxy radicals such as ethylene glycol, glycerol, trimethylolpropane, and other polyhydric alcohols having from 2 to 6 hydroxyl groups; n is a number having a value of from 4 l to 2,000; x is a number having a value of from 2 to 4; y has a value of from 2 to 10; and z has a value of from 1 to 5. More specifically, A and B represent radicals selected from the class comprising hydrogen; alkyl radicals having from 1 to 12 carbon atoms, e.g., methyl, ethyl, propyl, butyl, octyl, etc. radicals; cycloalkyl radicals having 5 to 7 carbon atoms in the ring, e.g., cyclopentyl, cyclohexyl, cycloheptyl, etc. radicals; mononuclear and binuclear aryl radicals, e.g., phenyl, naphthyl, biphenyl, etc. radicals; mononuclear aryl lower alkyl radicals wherein the alkyl groups attached to the aromatic nucleus contain a total of from 1 to 7 carbon atoms, e.g., benzyl, phenylethyl, phenylpropyl, etc.; and ester groups having from 1 to 12 carbon atoms such as the residues formed by the removal of a carboxyl hydrogen from a fatty acid, e.g., acetate, propionate, octoate, etc. residues; hydroxyether groups derived from glycols such as butylene glycol, octylene glycol, etc.; and groups formed by esterification with a hydroxyl group of a non-fatty acid, e.g., propyl phosphate, octyl sulfonate, butyl sulfate, etc.

The polyethers may be prepared from the various alkylene oxides (e.g. ethylene oxide), the higher 1,2-epoxides (such as 1,2-propylene oxide), the alkylene glycols (e.g., ethylene glycol) and mixtures of these The resulting products may be polyoxyalkylene diols or polyalkylene glycol derivatives; that is, the terminal hydroxyl groups can remain as such, or one or both of the terminal hydroxyl groups can be removed during the polymerization reaction or subsequent thereto, as by etherification or esterification to yield mono- or di-ether or mono- or di-ester groups or a combination of such terminal groups whereby certain desirable properties are imparted to the final polymeric mixtures. For example, in the above formula, A and/or b may be: alkyl radicals, forming a di-alkyl polyether (e.g., dibutyl heptaoxypropylene diether); ester forming radicals, forming alkyl oxyalkylene esters (e.g., butyl pentaoxylpropylene acetate); hydrogen, forming polyglycols (e.g., polyethylene glycol), etc.

To further exemplify the polyethers which can be used, the polyether oil, that is, the $-(C_xO)_n-$ section of the above formula, can be derived from such basic units as the following oxides:

sec-propylene oxide     $-(CH_2-CH-O)$
                                                        $CH_3$ sec-butylene oxide     $-(CH_2-CH-O)$
                                                    $CH_2$
                                                    $CH_3$ tert-butylene oxide           $CH_3$
                                  $-CH_2-C-O-$
                                          $CH_3$ etc. or basic units obtained by the dehydration of alkylene glycols, resulting in the formation of the following ethylene oxide—$(CH_2-CH_2-O)$— propylene oxide—$(CH_2-CH_2-CH_2-O)$ butylene oxide—$(CH_2-CH_2-CH_2-CH_2-O)$— etc.

Polyethers containing combinations of the above described basic units have been found to be quite useful in the practice of the present invention. A composition containing two different alkylene oxide groups can be prepared, for example, by reacting a polypropylene glycol with ethylene oxide in the presence of boron trifluoride. This mixed polyalkylene glycol, if desired, can then be reacted with an alkanol such as butanol to form the monobutoxyether of the mixed polyalkylene glycol. A number of these polyalkylene oxide materials are commercially available including the material sold under the tradename "Ucon" by Union Carbide Corporation, and the materials sold under the name of "Pluracol" by the Wyandotte Chemicals Corporation.

The molecular weight of the polyether oils used according to this invention can range from 300 to 200,000 from 400 to 20,000 being preferred.

The basic mixture of ingredients as disclosed above is used in the compositions of the instant case and depending on what other ingredients are formulated into such a composition there may be prepared the desired one-component or two-component RTV systems with the required sag-control. To obtain a two-compound RTV system, the above composition is packaged as a single separate package, and there is then packaged in a separate package in alkyl silicate or partial hydrolysis product of an alkyl silicate as a crosslinking agent in combination with a metal salt of a carboxylic acid as the catalyst. Thus, in the second package there may be prepared and added from 1 to 15 parts by weight based on 100 parts of the silanol end-stopped polymer of a silicate of the formula, $$R^5{}_m Si(O R^6)_{4-m} \qquad (4)$$

where $R^5$ and $R^6$ are alkyl radicals of 1 to 8 carbon atoms and m is 0 or 1 and partial hydrolysis products thereof. More broadly it should be disclosed that $R^5$ and $R^6$ can be any monovalent hydrocarbon radical, but are most preferably selected from alkyl radicals of 1 to 8 carbon atoms such as methyl, and aryl radicals such as phenyl, etc. The partial hydrolysis product of tetraethyl orthosilicate is a favorite crosslinking agent for such compositions. Per 100 parts of the silanol end-stopped diorganopolysiloxane polymer in the basic mixture of ingredients there is then added to the second package a catalyst which is preferably utilized at a concentration of 0.01 to 5 parts by weight per 100 parts of silanol polymer of a metal salt of a carboxylic acid which may be a metal salt of a monocarboxylic or dicarboxylic acid. In such a catalyst the metal varies from lead to manganese in the Periodic Table and is most preferably a tin salt such as dibutyltin dilaurate, dibutyltin oxide, tin octoate. Examples of such compositions is for instance to be found in the Lampe and Bessemer Patent referred to previously. Thus, in forming the composition the silanol polymer, the filler and the polyether are packaged in one package. The alkyl silicate or partial hydrolysis product thereof, along with the metal salt of a carboxylic acid is mixed together and packaged as such. When it is desired to cure the composition, the two packages are mixed together in a desired proportions and allowed to cure either in the presence or absence of moisture to a silicone elastomer. It should be noted that other additives may be present in the composition such as the self-bonding amino functional silanes of the foregoing Lampe and Bessemer Patent. In addition, water may be added to one or the other packages of the composition so as to result in rapid deep section cure in the compositon.

The above two-component room temperature vulcanizable silicone rubber composition will have acceptable sealant properties and will also have acceptable sag-control properties. However, in one respect, the properties of the composition will be found to have a short coming, that is, if the two-component room temperature vulcanizable silicone rubber composition is stored in separate packages for a period of time of six months to a year or more, then the work-life of the composition will decrease as much as six times or more. Thus, in a normal two-component room temperature vulcanizable silicone rubber composition in which the composition is stored after manufacture for a period of a year or more at a temperature of 25° C. or more, the work-life of the composition will decrease by a factor of six in one year. This leads to serious disadvantages and serious problems where it is desired to store the composition for periods of time of six months or a year or more and then the components can be mixed to form a two-part RTV composition. However, because of the time necessary to mix the ingredients and meter the ingredients onto the area that the sealant is to be applied, it is necessary to have a work-life time of 45 minutes to an hour so that the composition will not cure in the meter equipment prior to being applied to carry out its function.

Accordingly, it was highly desirable to modify the normal two-part room temperature vulcanizable silicone rubber composition having the instant sag-control additive in it, such that it had a suitable work-life even after being stored for periods of time of six months to a year or more, that is a work-life period of 45 minutes to an hour.

To solve this problem, it was decided to add from generally 0.13 to 5 part by weight and peferably from 0.13 to b 3.5 parts by weight of a low molecular weight silanol containing fluid having generally a viscosity of 5 to 1,000 centipoise at 25° C. More preferably, the fluid is a silanol terminated diorganopolysiloxane polymer of a viscosity varying from 5 to 500 centipoise at 25° C. wherein the fluid has a silanol content that varies from 5 to 9 percent by weight. The organo group in such a polymer may be selected from any monovalent hydrocarbon radicals which are well-known in the art, but is most preferably methyl, vinyl or phenyl or a mixture of such radicals. Most preferably the work-life extending fluid is a linear silanol terminated diorganopolysiloxane polymer having a viscosity varying from 5 to 50 centipoise at 25° C. with a silanol content that varies from 5 to 9 percent by weight and more preferably varies from 5 to 7 percent by weight in which fluid the organo groups are selected from methyl. A formula for such a fluid is as follows:

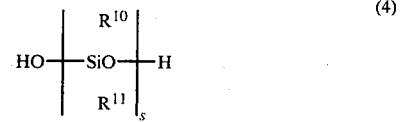

where $R^{10}$ and $R^{11}$ are individually selected from a class consisting of monovalent hydrocarbon radicals such as alkyl radicals of 1 to 8 carbon atoms methyl, ethyl, propyl, etc., halogenated alkyl radicals such as 3,3,3-trifluoropropyl, etc., cycloalkyl radicals such as cyclohexyl, cycloheptyl and so on. Most preferably the $R^{10}$ and $R^{11}$ are methyl or selected from a mixture of methyl, phenyl and vinyl. Generally, the s varies in the formula such that the polymer has a viscosity varying 5 to 1,000 centipoise at 25° C. and more preferably has a viscosity that varies from 5 to 500 centipoise at 25° C. and more preferably has a viscosity that varies from 5 to 50 centipoise at 25° C.

Most preferably, the silanol end-stopped low molecular weight polymer has a silanol content that varies from 5 to 9 percent by weight and more preferably varies from 5 to 7 percent by weight. Having such a work-life extending additive in the composition, it is possible to extend the work-life of the composition by a factor of 3 or 4 or more times depending on how much of the ingredient is added. It should be noted that the amount of low molecular weight silanol polymer will determine the amount of work-life extension that is imparted to the composition. Thus, by adding 0.13 to 5.0 parts of the silanol polymer per 100 parts of the base silanol material in the composition of the instant case, which parts are by weight, the work-life of the two-part composition can be extended by a factor of three or more such that even after periods of one year or more of storage of the basic two components of the RTV composition and the ingredients are mixed to be applied, the composition will have a work-life of 45 minutes to one hour at least so that it can be properly metered and applied to carry out a sealant function.

It should be noted that such compositions having both sag-control and extended work-life are highly suitable to being utilized as insulated glass compositions. Insulated glass if formed by taking two panes of glass and sealing the edges with an appropriate sealant such that the air between the two glasses is trapped inbetween. Such sealed two panes of glass form excellent sealed glass and RTV compositions have been used in such applications for sealing the two panes of glass together at the edges. However, normal two-component room temperature vulcanizable silicone rubber compositions had disadvantages with respect to such an insulated glass sealant application because of their lack of sag-control and because of their short work-life after being stored for a substantial period of time. Accordingly, the compositions of the instant case solved both the sag-control problem and the work-life limitations with respect to the prior art compositions and accordingly the two-component room temperature vulcanizable silicone rubber composition of the instant case is well-suited for insulated glass applications, that is, it has the appropriate sag-control and will stay in position after being metered into position between the insulated glass and it will adhere the insulated glass portions to each other as a sealant and maintain a good bond between the glass partitions and also prevent the elements from entering the air pocket which is formed between the two glass panes.

In addition, the work-life extension, which has been imparted to the instant composition by the low molecular weight silanol terminated diorganopolysiloxane composition of the instant case will result in the instant composition having the necessary work-life even after being stored for periods of time of one year or more at temperatures of 25° C. or more such that the composition will have the necessary work-life to seal glass partitions for the insulted RTV sealant glass application as discussed previously. It should be noted that the instant low molecular weight silanol terminated diorganopolysiloxane polymer of Formula (4) has been disclosed before for utilization in one-component and two-component RTV compositions as disclosed in the following U.S. patents: Beers No. 3,845,161, Beers No. 4,100,129, Beers No. 3,350,344, Beers No. 3,382,205, Beers No. 3,438,930, Beers No. 3,837,878, Beers No. 3,847,848, Beers et al. No. 4,102,025, Beers et al. No. 3,541,044, Beers et al. No. 3,708,467, Beers et al. No. 3,661,817, Beers et al. No. 3,714,089, Beers et al. No. 3,700,714, Beers et al. No. 3,962,160, Beers et al. No. 3,960,802.

There may also be present in the two-part room temperature vulcanizable silicone rubber compositions as an adhesion promoter from 0.1 to 5 parts by weight per 100 parts of the silanol end-stopped base polymer of an amine functional silane. Most preferably, the amine silane has the formula,

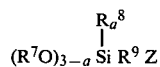

(6)

where $R^7$ is an alkyl radical of 1 to 8 carbon atoms; $R^8$ is selected from alkyl radicals of 1 to 8 carbon atoms, vinyl radicals and phenyl radicals; $R^9$ is a divalent hydrocarbon radical of 2 to 15 carbon atoms; Z is an amine functional group and a varies from 0 to 3. Most preferably, the compound of Formula (6) is gamma-aminopropyl triethoxysilane, bis-gamma-aminopropyltriethoxysilane or tris-gamma-aminopropyltriethoxysilane or mixtures of such silanes. In the most preferred embodiment the amine functional silane of Formula (6) is gamma aminopropyltriethoxysilane. More preferably, the gamma-aminopropyltriethoxysilane is utilized in the concentration of 0.2 to 3 parts by weight per 100 parts of the base silanol end-stopped polymer. It should be noted that the instant invention is not limited solely to the aminopropyl type of substituents, and there can be used any amine functional silane, that is, Z can be any amine functional group, such that the compound of Formula (6) can be any amine functional silane.

All of these ingredients of the composition are well-known and are easily available to silicone manufacturers of RTV compositions. The silicate is made by the reaction of the appropriate chlorosilane with an alcohol and the silanol end-stopped diorganopolysiloxane polymer is produced by a polymerization process which is relatively straight forward. Thus, generally the appropriate diorganodichlorosilanes are hydrolyzed to produce a hydrolysate containing cyclosiloxanes and linear silanol end-stopped diorganopolysiloxanes and the foregoing mixture of ingredients is then cracked with potassium hydroxide catalyst at temperatures above 150° C. so as to preferentially distill and collect overhead cyclotetrasiloxanes. The appropriate cyclotetrasiloxanes are then taken and there is added to them the necessary amount of water or there is added to them the necessary amount of chain-stoppers in the form of low molecular weight silanol end-stopped diorganopolysiloxanes whereupon by the heating of the chainstoppers with the tetrasiloxanes in the presence of KOH at elevated temperatures or in the presence of mild acid catalyst there results the formation of linear silanol end-stopped diorganopolysiloxane polymers of Formula (3) above having a viscosity varying from 500 to 10,000,000 centipoise at 25° C. and more preferably having a viscosity varying from 500 to 5,000,000 centipoise at 25° C. When the reaction with the KOH which is carried out at elevated temperatures, that is temperatures above 150° C., is terminated the reaction mixture is cooled down, there is added to it a neutralizing agent which is preferably a silyl phosphate and the unreacted cyclics are stripped off to yield the desired silanol end-stopped polymer which is the basic polymer of the compositions of the instant case and is the basic polymer of most one-component and two-component RTV compositions.

Accordingly, the invention of the instant case relates to the use in the basic composition of a mixture of ingredients disclosed above of the silanol polymer, the polyether and the filler to produce a desired two-component or two-part RTV composition with the necessary sag-control. The foregoing basic mixture of ingredients can also be utilized with advantage to produce one-component systems. In another embodiment of the instant case, the basic mixture of ingredients disclosed above can be taken and there can be added to them and mixed in them in an anhydrous state from 1 to 15 parts by weight of a silane of the formula,

(5)

where $R^3$ and $R^4$ are hydrocarbon radicals such as allyl radicals of 1 to 8 carbon atoms, mononuclear aryl radicals such as phenyl, alkenyl radicals such as vinyl allyl, cycloalkyl radicals such as 3,3,3-trifluoropropyl. Most preferably $R^3$ and $R^4$ are alkyl radicals of 1 to 8 carbon atoms such as methyl, ethyl, etc. Most preferably, the compound within the scope of Formula (5) above is methyl trimethoxysilane as a crosslinking agent in the one-component compositions of one embodiment of the invention of the instant case. Said mixture of ingredients can be packaged in the anhydrous state or substantially in anhydrous state and then when exposed to atmospheric moisture by breaking the seal of the water-proof package and applying the composition which is exposed to atmospheric moisture the composition cures slowly to form a silicone elastomer. The cure of such a composition may be accelerated by adding to it a catalyst. It should be noted that the compound of Formula (5) is used concentration of 1 to 15 parts by weight per 100 parts of the base silanol end-stopped diorganopolysiloxane polymer. To accelerate the cure of the composition as stated above there may be utilized a metal salt of a carboxylic acid as a catalyst, such metals being selected from lead to manganese in the Periodic Table. Where the metal salt of a monocarboxylic acid or a dicarboxylic acid is utilized at a concentration of anywhere from 0.01 to 5 parts of the silanol end-stopped base polymer. However, the most preferred catalyst for such an alkoxy functional silane crosslinking agent one-component systems is the titanium chelate catalyst that is disclosed in Beers' U.S. Pat. No. 4,100,129 which is the preferred catalyst. There is utilized from 0.01 to 5 parts of the titanium chelate catalyst per 100 parts of the silanol end-stopped polymer. There may be added other ingredients to such composition for various purposes as disclosed in the foregoing Beers' U.S. Pat. No. 4,100,129 such as plasticizers adhesion promoters such as triallyl isocyanurate, flame-retardant additives and other well-kown additives. Such compositions are packaged with all the ingredients mixed in the anhydrous state or substantially anhydrous state and packaged in a water-proof package or caulking tube. When it is desired to cure the composition the seal on the package is broken and the composition is applied such that it is exposed to atmospheric moisture. Upon being exposed to atmospheric moisture, it will cure over a period of time to form a silicone elastomer of desirable properties.

It should be noted that the present polyethers can be added as sag-control additives with all one-part RTV compositions. However, the ones that are disclosed in the present application are the preferred one-component RTV compositions in which such sag-control additives can be utilized, that is the use of the polyether as a sag-control additive. In the most preferred embodiment in which the sag-control additive polyethers of the instant case are utilized and in which the basic mixture of ingredients disclosed above are utilized is one in which the crosslinking agent is a silane of the formula,

$$R^1Si(O\overset{O}{\underset{\|}{C}}R^2)_3 \qquad (6)$$

wherein $R^1$ is a monovalent hydrocarbon radical and $R^2$ is a monovalent hydrocarbon radical also of 1 to 30 carbon atoms. It should be noted that the above silane of Formula (6) is utilized at a concentration of anywhere of 1 to 15 parts by weight per 100 parts by weight of the silanol end-stopped base polymer. The radical $R^1$ can be any hydrocarbon radical such as an alkyl radicals, aryl radicals, alkenyl radicals, cycloalkyl radicals and fluoroalkyl radicals andis most preferably an alkyl radical of 1 to 8 carbon atoms and most preferably methyl, since such a silane is the most easiest to formulate. Correspondingly, $R^2$ can be any monovalent hydrocarbon radical such as an alkyl radical of 1 to 8 carbon atoms, an alkenyl radical of 2 to 8 carbon atoms such as vinyl and a mononuclear aryl radical such as phenyl, a cycloalkyl radical such as cyclohexyl and a fluoroalkyl radical such as 3,3,3-trifluoropropyl. Most preferably $R^2$ in Formula (6) is methyl and the compound of Formula (6) is methyl triacetoxy silane. However, there has recently been formulated an improved RTV which is non-corrosive and has low odor in which composition $R^2$ can be either 2 ethyl-hexyl or phenyl as disclosed in the U.S. Pat. application of M. Dale Beers' Ser. No. 919,544, filed June 27, 1978, entitled "Curable Compositions and Processes" and now abandoned. The subject matter of this application is incorporated into the present case by reference. This is the less preferred embodiment of the instant case. Accordingly, in a less preferred embodiment of the instant case, in Formula (6) the crosslinking agent is formulated such that $R^1$ is an alkyl radical of 1 to 8 carbon atoms and most preferably methyl and $R^2$ is a hydrocarbon radical of 6 to 30 carbon atoms such that the silane can be for instance methyltris 2(ethyl-hexanoxy) silane. The catalyst with such a crosslinking agent are preferably utilized in a concentration of 0.01 to 5 parts by weight per 100 parts of the base silanol end-stopped diorganopolysiloxane polymer and are preferably metal salts of a monocarboxylic acid or dicarboxylic acid, where the metal varies from lead to manganese in the Periodic Table and are most preferably tin salts of a monocarboxylic acid such as tin octoate, dibutyltin dilaurate, dibutyltin diacetate.

These are the basic additives and ingredients of such a one-component system. Accordingly, these ingredients along with the basic ingredients disclosed above may be mixed in an anhydrous state in the concentrations disclosed above and when it is desired to cure the composition, the seal is broken on the water-proof container, and the composition is applied to whatever from it is desired and exposed to atmospheric moisture, whereupon it will cure to form a silicone elastomer with desirable properties. There can be utilized various other additives in the most preferred one-component system disclosed above with the silane of Formula (6) as the crosslinking agent. Thus, while still maintaining the composition as a low modulus composition there may be incorporated into the composition additional amounts of non-reinforcing extending fillers. Thus, there may be incorporated into the composition per 100 parts of the base silanol end-stopped diorganopolysiloxane base polymer from 1 to 400 parts by weight of a non-reinforcing extended filler. Examples of such non-reinforcing extending fillers being titanium dioxide, lithopone, zinc oxide, zirconium oxide, aluminum oxide, alpha quartz, calcined clay, carbon, graphite, quartz, cotton and synthetic fibers. Preferably there is utilized from 1 to 100 parts by weight of the base silanol end-stopped polymer.

There can also be utilized in the preferred composition of the instant case, an adhesion promoter such as dialkoxy-diacyloxy silane. Thus, there may be utilized from 0.1 to 5 parts by weight of such dialkoxyl-diacyloxy silane per 100 parts of the silanol end-stopped polymer as disclosed in Kulpa U.S. Pat. No. 3,296,161, which patent is incorporated into the present case by reference. A preferred adhesion promoter disclosed in that patent, is ditertiarybutoxy diacetoxysilane.

There can also be incorporated from 1 to 50 parts by weight of a triorgano silyl end-stopped diorganopolysiloxane polymer having a viscosity from 10 to 5,000 centipoise at 25° C. where the organo groups are monovalent hydrocarbon radicals and are more preferably selected from alkyl radicals of 1 to 8 carbon atoms such as methyl. Such linear diorganopolysiloxane polymers which are triorgano silyl end-stopped are useful as plasticizers in the composition. It should be noted that preferably such polymers are without any silanol content but usually as the result of the process by which they are produced, and that is by hydrolysis procedures of diorganodichlorosilanes, there may result some silanol content in the final polymer such silanol content being generally less than 500 parts per million. Preferably, the molecular weight of such plasticizer polymers is such that the polymer has a viscosity of anywhere from 10 to 1,000 centipoise at 25° C. and the organo substituent groups are methyl. Such polymers are obtained by the hydrolysis of triorganochlorosilanes with diorganodichlorosilanes and then taking the hydrolyzate and stripping off the excess water and acid to leave behind the desired polymer. There may be added to such compositions also optionally from 5 to 20 parts by weight per 100 parts of the silanol end-stopped base polymer of a highly trifunctional silicone fluid. The addition of such a fluid improves the modulus, that is lowers the modulus of the composition and improves its self-bonding characteristics. In the case of the composition disclosed in Beers' Patent Application Ser. No. 919,544, disclosed above, that is with the methyltris 2(ethyl-hexanoxy) silane crosslinking agent, the highly trifunctional silicone fluid improves the oil resistance of the composition and the thermal resistance of the composition.

Thus, there may be present per 100 parts by weight of the silanol end-stopped polymer from 1 to 20 parts by weight of fluid siloxane containing a high degree of trifunctionality, tetrafunctionality or a mixture of tri and tetrafunctionality and comprising (i) from 25 to 60 mole percent of monoalkyl siloxy units, siloxy units on mixtures of such units, (ii) from 1 to 6 mole percent of trialkyl siloxy units and (iii) from 34 to 74 mole percent of dialkyl siloxy units wherein said polysiloxane contains from about 0.1 to about 2 percent by weight of silicon bonded hydroxyl groups. The highly trifunctional polysiloxane component disclosed above can be made by means known to those skilled in the art. For instance, a mixture of monoalkyl trichlorosilane, dialkyl dichlorosilane and alkyl trichlorosilane, silicone tetrachloride or a mixture thereof at the desired mole rate can be run into toluene and water to hydrolyze the chlorosilanes. Then the mixture can be heated for example, at about 60° C. for a time of anywhere from 1 to 3 hours sufficient to insure completion of the reaction. The oil phase is then separated and neutralized by washing with an aqueous solution of sodium carbonate or bicarbonate. After filtration to remove insolubles and devolatization by heating at about 140° C. under a vacuum, for instance at 2 mm of mercury, the highly trifunctional silicone fluid remains. It is desired that the hydroxyl content be maintained at less than 0.6 percent by weight to minimize the viscosity of the final sealant compositon and to keep the cross-linking level to a minimum. The hydroxyl content can be decreased by heating the product at 110° C. in the presence of approximately 1 percent of sodium carbonate. However, after the silanol condensation, the water can be removed by azeotropic distillation with toluene and after removal of the toluene the product is filtered before use.

Such a high trifunctional fluid as well as the method for preparing it, is disclosed in Beers' U.S. Pat. No. 3,382,205, which is hereby incorporated in the present case by reference. The preferred fluid contains 4 mole percent trimethylsiloxy units, 56 mole percent dimethylsiloxy units, 40 mole percent methylsiloxy units and 0.5 weight percent of silanol groups.

Other compounds can be added to the composition such as carbon black, platinum and other ingredients to improve its flame-retardancy. In addition, iron oxide can be added to the composition in small quantities so as to improve the thermal resistance of the composition as disclosed in the foregoing Beers' U.S. Pat. application Ser. No. 919,544. By utilizing the above procedure can there be obtained a one-component room temperature vulcanizable silicone rubber composition which is packaged in the anhydrous state in a water-proof container. When it is desired to cure the composition, the seal on the container is broken and the composition is applied with the desired sag-control and will cure upon exposure to atmospheric moisutre to a silicone elastomer with the desired low modulus properties if the composition is formulated in accordance with the discussion setforth herein above with respect to the amount of fumed silica filler in a composition. It should be noted that the present polyethers can be utilized as sag-control additives in most RTV compositions both one-part and two-part utilizing a silanol end-stopped diorganopolysiloxane polymer as a basic polymer in the composition if the composition does not contain any additive that will interract with the polyether and tie it up and prevent it from exerting its sag-control effect.

The examples below are given for the purpose of illustrating the present invention. They are not given for any purpose of limiting the definition and scope of the instant invention. All parts in the examples are by weight.

The Boeing Flow Jig Test was utilized in examples to determine the amount of sag-control in the compositions tested. The Boeing Flow Jig Test is carried out as follows: the ingredients are mixed together by hand for 1 to 2 minutes then a portion of the mixture is placed on a Boeing Flow Jig, which measures the flow properties of the mixture. The mixture is placed in a bowl and then the horizontal test jig is taken and placed on one end so that the polysiloxane mixture can flow vertically downward from the bowl on a scale; the amount of flow downward due to the force of gravity after 35 seconds is measured in inches of flow.

Such a test gives an indication of the sag-control imparted to the instant compositions by the polyether ingredients of the instant invention.

EXAMPLE 1

There was prepared a composition by mixing 25 parts of 126,000 centipoise silanol end-stopped dimethylpolysiloxane fluid, and 75 parts of 24,000 centipoise silanol end-stopped dimethylsiloxane fluid. After the mixture had been mixed there was added to it the amount of parts indicated in the Table 1 below of a highly trifunctional fluid comprising 4 mole percent trimethylsiloxy units, 56 mole percent dimethylsiloxy units and 40 mole percent methylsiloxy units and having a 0.5 weight percent silanol content. The trifunctional fluid in Table 1 below is Compound D. After the mixture had been blended to uniformity, there was added to it the indicated amount of parts of fumed silica which had been treated with octamethyl cyclotetrasiloxane, Compound C in Table 1 below. Component A and B are the silanol fluids, Component A being the 126,000 centipoise silanol fluid and Component B being the 24,000 linear silanol end-stopped dimethylpolysiloxane fluid. To these ingredients there was added Component E, which is a 50 centipoise at 25° C. linear dimethylpolysiloxane trimethyl siloxy end-stopped polymer which is present as a plasticizer in the composition. To these ingredients there was then added the polyethers indicated in Table 1 below, Pluracol V-7 being a polyether manufactured by the Wyandotte Chemicals Corporation; Pluracol being a tradename of such a gorporation and UCON LB-1145 being a tradename for a polyether sold by the Union Carbide Corporation. These mixtures of ingredients were then mixed for 30 minutes under approximately 29 to 30 inches of water vacuum. One hundred parts of the above composition was then catalyzed with 4.2 parts of a catalyst composition and the composition was catalyzed in the Semco mixer. The catalyst composition comprised 80 parts by weight of methyltriacetoxysilane, 20 parts of ditertiarybutoxy diacetoxysilane and 0.6 parts of dibutyltin dilaurate, this is Component letter F in Table 1 below. The concentration of the ingredients to prepare the compositions as well as the results in the Boeing Flow Test is shown in Table 1 below.

TABLE 1

| Component Letter | Sag-Control Composition 1 | Composition 2 | Composition 3 |
|---|---|---|---|
| A (126,000 cps) 25p } Blend | 100 pbw | 100 pbw | 100 pbw |
| B (24,000 cps) 75p | | | |
| C Treated Filler | 12.0 pbw | 12.0 pbw | 12.0 pbw |
| D Trifunctional silcone fluid | 11.4 pbw | 11.4 pbw | 11.4 pbw |
| E Dimethyl fluid (50 cps) | 27.3 pbw | 27.3 pbw | 27.3 pbw |
| Pluracol V-7 | — | — | 0.75 pbw |
| UCON LB-1145 | — | 1.5 pbw | — |
| F Wt % on above | 4.2 | 4.2 | 4.2 |
| Boeing Flow, inches | 3.9 | 0.10 | 0.15 |

It should be noted that a sag of 0.3 inches is normally considered an upper limit for a non-sag product or a product having sag-control in the Boeing Jig Flow Test. Accordingly, as seen from the results of Table 1 above, the compositions of the instant case pass the test easily.

EXAMPLE 2

There was prepared a composition in which 74 parts by weight of a silanol end-stopped linear dimethylploysiloxane polymer of 126,000 centipoise viscosity at 25° C. was mixed with 0.7 parts of Pluracol V-7 which is a tradename for polyether sold by the Wyandotte Chemical Corporation. The mixture was blended and there was added to it 11.0 parts of a octamethylcyclotetrasiloxane treated fumed silica filler. This mixture of ingredients was then added and to them there was added 26 parts by weight of a linear silanol end-stopped dimethylpolysiloxane polymer of 3500 centipoise viscosity of 25° C. and a linear trimethyl siloxy end-stopped dimethylpolysiloxane polymer having 100 centipoise viscosity at 25° C. This mixture was mixed for 30 minutes under 29 to 30 inches of water vacuum. To 100 parts of the resulting mixture there was added 4.2 parts by weight of a catalyst composition so as to catalyze the composition in the Semco mixer. The catalyst comprised 80 parts of methyltriacetoxy silane, 20 parts of ditertiary butoxy diacetoxy silane and 0.6 parts of dibutylin dilaurate. The resulting composition was tested in various tests and the results are set forth in Table 2 below. As the results in Table 2 below indicate the composition had excellent properties as well as good sag-control and was of medium modulus.

TABLE 2

| Application Rate, gm/min. | 170 |
|---|---|
| Boeing Flow, inches | 0.1 |
| Tack Free Time, minutes | 20-25 |

Physical properties measured on test specimen cut from 4"×5"×0.1" ASTM sheet press cured 1 hour + 7 days at laboratory ambient conditions.

| | Shore A Hardness | 22 | |
|---|---|---|---|
| | Tensile Strength, psi | 170 | |
| | Elongation, % | 400 | |
| Peel Adhesion: | 1" wide × 4" length | 2.0 in./min. pull rate | |
| Substrate | Lb./in. | % Cohesive Failure | |
| Anodized Aluminum | 17 | 100 | |
| Polyacrylate Sheet | 17 | 100 | |

Accelerated Storage Stability

The above material was stored in 3 oz. aluminum tube for 60 days at 50° C. The tube was removed from the oven, allowed to cool to ambient temperature, and the following tests were run.

| Tack Free Time, minutes | 30-35 |
|---|---|
| Shore A Hardness | 21 |

EXAMPLE 3

There was prepared a blend of a 126,000 centipoise at 25° C. silanol-terminated dimethylpolysiloxane polymer and of 24,000 centipoise viscosity at 25° C. of a silanol-terminated dimethylpolysiloxane polymer wherein the blend had a final viscosity of 100,000 centipoise at 25° C. To 100 parts of this blend there was added 100 parts of ground silica, 7.0 parts of octamethyl cyclotetrasiloxane treated fumed silica, 2.7 parts of a silanol-terminated low molecular weight dimethylpolysiloxane having 7 percent silanol, 0.3 parts by weight of Pluracol V-7, a polyether sold by the Wyandotte Chemical Corporation and 0.4 parts by weight of water. This mixture was Component A.

There was then prepared a Component B comprising 37.4 parts of a trimethyl siloxy end-stopped dimethylpolysiloxane fluid to which was added 20.1 parts of calcium carbonate, 15.1 parts of gamma amino propyltriethoxysilane, 7.55 parts of partially hydrolyzed ethyl orthosilicate, 18.7 parts of carbon black and 1.05 parts of solubilized dibutyl tin oxide. This two-part RTV composition was cured by catalyzing 100 parts of Component A with 10 parts by weight of Component B. The resulting cured and uncured composition had the following properties as set forth in Table 3 below.

TABLE 3

| Uncatalyzed (Part A) | |
|---|---|
| Viscosity, cpp | 325,000 |
| Catalyzed Material | |
| Boeing Flow, inches | 0.2 |
| Tack Free Time, minutes | 75 |
| Cured Material | |
| ASTM Sheet cured physical properties | |
| Shore A | 48 |
| Tensile, psi | 350 |
| Elongation, % | 190 |

The above mixture without Pluracol V-7 would have a Boeing Sag in excess of 1 inch, i.e. greater than the 0.3 inches considered tolerable.

EXAMPLE 4

There was prepared a Component F comprised 1,000 parts of a 20,400 centipoise at 25° C. silanol terminated dimethylpolysiloxane polymer to which was added 100 parts by weight of 10 micron crushed quartz, 6.0 parts of fumed silica treated with methyl cyclictetrasiloxanes and 1.2 parts by weight of a linear silanol terminated low molecular weight dimethylpolysiloxane oil having 7.3 percent silanol and having a viscosity of 5 to 50 centipoise at 25° C. There was then prepared a Component G comprising 100 parts by weight of the foregoing linear silanol terminated dimethylpolysiloxane polymer having 20,400 centipoise at 25° C. To this there was added 100 parts by weight of a 10 micron crushed quartz, 7.0 parts of fumed silica treated with octamethyl cyclotetrasiloxane, 2.7 parts of a silanol terminated linear low molecular weight dimethylpolysilocane polymer having a viscosity of 5 to 50 centipoise at 25° C. and 4.2 parts by weight of water and 0.3 parts by weight of UCONLB-1145 which is a polyether sold by Union Carbide Corporation.

There was prepared a Component H comprising 100 parts by weight of the linear silanol terminated dimethylpolysiloxane polymer of 20,400 centipoise at 25° C. to which was added 100 parts by weight of 10 micron crushed quartz, 8.0 parts of fumed silica treated with octamethyl cyclotetrasiloxane, 2.7 parts of a low molecular weight silanol terminated dimethylpolysiloxane polymer having a viscosity of 5 to 50 centipoise at 25° C., 0.42 parts of water and 0.2 parts by weight of Pluracol V-7, a polyether sold by the Wyandott Chemical Corporation.

There was prepared a catalyst composition Component I comprising 360 parts by weight of a vinyl terminated dimethylpolysiloxane polymer having 3,000 centipoise at 25° C., the polymer being linear, to which was added 60 parts of fumed silica treated with octamethyl cyclotetra siloxane, 182 parts of calcium carbonate, 220 parts of gamma-aminopropyltriethoxysilane, 111 parts of partially hydrolyzed ethyl orthosilicate, 15.5 parts of solubilized dibutyl tin oxide and 6.0 parts of carbon black. Ten parts of Composition I was utilized to catalyze 100 parts of Composition F, G and H. The resulting mixtures of the compositions were tested for worklife and viscosity build up as shown in Table 4 below.

TABLE 4

|  | Control | | |
| --- | --- | --- | --- |
|  | Component F & I | Component G & I | Component H & I |
| Viscosity |  |  |  |
| Original Base Viscosity cps. | 325,000 | 750,000 | 1,560,000 |
| 1 month 50° C. viscosity, cps. |  |  | 535,000 |
| 2 months 50° C. viscosity, cps. | — | 650,000 | — |
| 3 months 50° C. viscosity, cps. | 795,000 | 630,000 | 470,000 |
| Work Life (WL) |  |  |  |
| Using 10p. Component I catalyst per 100 p. of each base |  |  |  |
| Original WL 24 hrs. old | 100 min. | 120 min. | 107 min. |
| 1 month 50° C. WL | — | 79 min. | 78 min. |
| 2 months 50° WL | — | 65 min. | 57 min. |
| 3 months 50° C. WL | 16 min. | 60 min. | 55 min. |

*Base run at 50° C. accelerated aging were allowed to cool to 25° C. for 24 hrs. prior to viscosity measurements.

The results in Table 4 show the influence of low molecular weight silanol terminated diorganopolysiloxane polymer at a concentration of 2.7 parts versus 1.2 per thousand parts of the silanol terminated base polymer. The work-life after the compositions had been accelerated tested for storage at one year at 25° C. was found to be three times longer for the composition containing the higher level of low molecular weight silanol terminated polysiloxane. It should be noted that three months at 50° C. is equivalent with respect to work-life testing to one year at 25° C. Accordingly, the compositions of the instant case gave a composition with the proper viscosity control even after periods of three months at 50° C. and gave an appropriate work-life of the composition after three months at 50° C.

We claim:

1. A base material for forming a room temperature vulcanizable silicone rubber composition which has sag-control comprising
   (A) 100 parts by weight of a silanol end-stopped diorganopolysiloxane of a viscosity varying from 500 to 1,000,000 centipoise at 25° C. where the organo group is a monovalent hydrocarbon radical;
   (B) at least 3 parts of fumed silica;
   (C) from 0.03 to 2.0 parts by weight of a polyether selected from the formulas consisting of

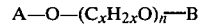
$$A-O-(C_xH_{2x}O)_n-B$$

and

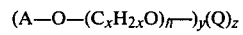
$$(A-O-(C_xH_{2x}O)_n-)_y(Q)_z$$

wherein A and B represent radicals selected from the class consisting of hydrogen, alkyl radicals containing from 1 to 12 carbon atoms, cyclo alkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

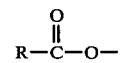
$$\begin{matrix} & O \\ & \| \\ R-& C-O- \end{matrix}$$

wherein R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; n is a number having a value of from 4 to 2000; x is a number having a value of 2 to 4; y has a value of from 2 to 10; and z has a value of from 1 to 5; the polyether having a molecular weight of from about 300 to about 200,000.

2. The base material of claim 1 which is formed into a one-compon room temperature vulcanizable silicone rubber composition by adding to it from 1 to 15 parts by weight of a silane of the formula,

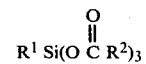
$$R^1Si(O\overset{O}{\overset{\|}{C}}R^2)_3$$

wherein R¹ is an alkyl radical of 1 to 8 carbon atoms and R² is hydrocarbon radical of 1 to 30 carbon atoms.

3. The room temperature vulcanizable silicone rubber composition of claim 1 wherein there if further present a curing catalyst which comprises from 0.01 to 5 parts by weight of metal salt of a carboxylic acid where the metal varies from lead to manganese in the Periodic Table.

4. The base material of claim 1 which is formed into a one-component room temperature vulcanizable silicone rubber composition by adding to it from 1 to 15 parts by weight of a silane of the formula, $$R^3Si(OR^4)_3$$

where $R^3$ and $R^4$ are alkyl radicals of 1 to 8 carbon atoms.

5. The room temperature vulcanizable silicone rubber composition of claim 4 wherein there is further present from 1 to 15 parts by weight of a titanium chelate catalyst.

6. The base material of claim 1 which is formed into a two-component room temperature vulcanizable silicone rubber composition by mixing into where it is desired to use the composition a mixture of ingredients comprising from 1 to 15 parts by weight of a silicate of the formula, $$R_m^5Si(OR^6)_{4-m}$$

wherein $R^5$ and $R^6$ are alkyl radicals of 1 to 8 carbon atoms and m is 0 or 1 and partial hydrolysis products thereof, and from 0.01 to 5 parts by weight of a metal salt of a carboxylic acid where the metal varies from lead to manganese in the Periodic Table.

7. The base material of claim 1 wherein in (B) there is present from 3 to 15 parts by weight of untreated fumed silica filler.

8. The base material of claim 1 wherein in (B) there is present from 4 to 28 parts by weight of fumed silica treated with cyclopolysiloxanes.

9. The base material of claim 8 wherein there is further present from 1 to 400 parts by weight of an extending non-reinforcing filler.

10. The one-component room temperature vulcanizable silicone rubber composition of claim 2 wherein there is further present from 1 to 50 parts by weight of a triorganosilyl end-stopped diorganopolysiloxanes of 10 to 5,000 centipoise, viscosity at 25° C. where the organo groups are hydrocarbon radicals.

11. The one-component composition of claim 10 wherein there is further present from 1 to 20 parts by weight of a fluid polysiloxane having (i) from 25 to 60 mole percent of monoalkylsiloxy units, siloxy units or a mixture of such units; (ii) from 1 to 6 mole percent of trialkylsiloxy units; and (iii) from 34 to 74 mole percent of dialkylsiloxy units, said polysiloxane containing from about 0.1 to about 2% by weight of silicone-bonded hydroxyl groups.

12. A process for forming a base material which is used to form a room temperature vulcanizable silicone rubber composition which has had sag-control, comprising, mixing;
(A) 100 parts by weight of silanol end-stopped diorganopolysiloxane of a viscosity varying from 500 to 1,000,000 centipoise at 25° C. where the organo group is a monovalent hydrocarbon radical:
(B) at least 3 parts of fumed silica;
(C) from 0.03 to 2.0 parts by weight of a polyether selected from the formulas consisting of $$A-O-(C_xH_{2x}O)_{\overline{n}}-B$$

and $$(A-O-(C_xH_{2x}O)_n-)_y(Q)_z$$

wherein A and B represent radicals selected from the class consisting of hydrogen, alkyl radicals containing from 1 to 12 carbon atoms, cyclo alkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

$$R\overset{O}{\underset{\|}{C}}O$$

wherein R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; n is a number having a value of from 4 to 2,000; x is a number having a value of 2 to 4; y has a value of from 2 to 10; and z has a value of from 1 to 5; the polyether having a molecular weight of from about 300 to about 200,000.

13. A process for forming the base material of claim 12, from which is formed a one-component room temperature vulcanizable silicone rubber composition by adding to it from 1 to 15 parts by weight of asilane of the formula, $$R^1Si(O\overset{O}{\underset{\|}{C}}R^2)_3$$

wherein R¹ is an alkyl radical of 1 to 8 carbon atoms and R² is hydrocarbon radical of 1 to 30 carbon atoms.

14. The process for forming the room temperature vulcanizable silicone rubber composition of claim 13 wherein there is further present a curing catalyst which comprises from 0.01 to 5 parts by weight of a metal salt of a carboxylic acid where the metal varies from lead to manganese in the Periodic Table.

15. The process for forming the base material of claim 12 which is formed into a one-component room temperature vulcanizable silicone rubber composition by further adding to it from 1 to 15 parts by weight of a silane of the formula, $$R^3Si(OR^4)_3$$

where $R^3$ and $R^4$ are alkyl radicals of 1 to 8 carbon atoms.

16. The one-component room temperature vulcanizable silicone rubber composition of claim 15 wherein there is further present from 0.01 to 5 parts by weight of a titanium chelate catalyst.

17. The process for forming the base material of claim 1 which is further formed into a two-component room temperature vulcanizable silicone rubber composition by mixing into the base material of the above claim, when it is desired to cure the composition a mixture of ingredients comprising from 1 to 15 parts by weight of a silicate of the formula, $$R_m{}^5Si(OR^6)_{4-m}$$

where $R^5$ and $R^6$ are alkyl radicals of 1 to 8 carbon atoms and m is 0 or 1 and partial hydrolysis products thereof and from 0.01 to 5 parts by weight of a metal salt of a carboxylic acid where the metal varies from lead to manganese in the Periodic Table.

18. The process for forming the base material of claim 12 wherein in (B) there is present from 3 to 15 parts by weight of untreated fumed silica filler.

19. The process for forming the base material of claim 12 wherein in (B) there is present from 4 to 28 parts by weight of fumed silica treated with cyclopolysiloxanes.

20. The process for forming the base material of claim 19 wherein there is further present from 1 to 400 parts by weight of an extending non-reinforcing filler.

21. The one-component room temperature vulcanizable silicone rubber composition of claim 13 where there is further present from 1 to 50 parts by weight of triorganosilyl end-stopped diorganopolysiloxane polymer of a viscosity varying from 10 to 5,000 centipoise, viscosity, where the organo groups are hydrocarbon radicals.

22. The one-component room temperature vulcanizable silicone rubber composition of claim 21 where there is further present from 1 to 20 parts by weight of a fluid polysiloxane having (i) from 25 to 60 mole percent of monoalkylsiloxy units, siloxy units or a mixture of such units; (ii) from 1 to 6 mole percent of trialkylsiloxy units; and (iii) from 34 to 74 mole percent of dialkylsiloxy units, polysiloxane containing from about 0.1 to about 2% by weight of silicone-bonded hydroxyl groups.

23. A process for sealing an area adjacent surface which is selected from the class consisting of plastic surfaces, metal surfaces, masonry surfaces and cellulosic surfaces comprising;
  (1) applying to the surface at room temperature a mixture of ingredients having therein;
    (A) 100 parts by weight of silanol end-stopped diorganopolysiloxane of a viscosity varying from 500 to 1,000,000 centipoise at 25° C. where the organo group is a monovalent hydrocarbon radical;
    (B) at least 3 parts of fumed silica;
    (C) from 0.03 to 2.0 parts by weight of polyether selected from the formulas consisting of $$A{-}O{-}(C_xH_{2x}O)_n{-}B$$

and $$(A{-}O{-}(C_xH_{2x}O)_n{-})_y(Q)_z$$

wherein A and B represent radicals selected from the class consisting of hydrogen, alkyl radicals containing from 1 to 12 carbon atoms, cycloalkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

$$R{-}\overset{\underset{\|}{O}}{C}{-}O{-}$$

wherein R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; n is a number having a value of from 4 to 2,000; x is a number having a value of 2 to 4; y has a value of from 2 to 10; and z has a value of from 1 to 5; the polyether having a molecular weight of from about 300 to about 200,000; and
    (D) from 1 to 15 parts by weight of a silane of the formula, $$R^1 Si(O\overset{\underset{\|}{O}}{C} R^2)_3$$

wherein $R^1$ is an alkyl radical of 1 to 8 carbon atoms and $R^2$ is hydrocarbon radical of 1 to 30 carbon atoms; and
  (2) allowing the composition to cure at room temperature 24. A process for sealing the surface of claim 23 wherein in the composition there is further present a curing catalyst which comprises from .01 to 5 parts by weight of a metal salt of a carboxylic acid when the metal varies from lead to manganese in the Periodic Table.

25. The process for sealing the surface in accordance with claim 23 wherein (B) there is present from 3 to 15 parts by weight of untreated fumed silica filler.

26. The process for sealing a surface of claim 23 wherein in (B) there is present from 4 to 28 parts by weight of fumed silica treated with cyclopolysiloxanes.

27. The process for sealing the surface of claim 26 where there is further present from 1 to 400 parts by of an extending non-reinforcing filler.

28. The process of sealing the surface of claim 23 wherein there is further present from 1 to 50 parts by weight of a triorganosilyl end-stopped diorganopolysiloxane polymer of 10 to 5,000 centipoise viscosity at 25° C. where the organo groups are hydrocarbon radicals.

29. A process for sealing the surface of claim 28 wherein there is further present from 1 to 20 parts by weight of a fluid polysiloxane having (i) from 25 to 60 mole percent of monoalkylsiloxy units, siloxy units or a mixture of such units; (ii) from 1 to 6 mole percent of dialkylsiloxy units, said polysiloxane containing from about 0.1 to about 2% by weight of silicone-bonded hydroxyl groups.

30. The process for sealing the surface of claim 23 wherein (D) is methyltris 2(ethylhexanoxy) silane.

31. The two-component room temperature vulcanizable silicone rubber composition of claim 6 which further contains from 0.13 to 5 parts by weight of a low molecular weight silanol terminated organopolysiloxane polymer having a viscosity varying from 5 to 1,000 centipoise at 25° C. where the organo groups are monovalent hydrocarbon radicals.

32. The two-component room temperature vulcanizable silicone rubber composition of claim 31 in which the low molecular weight silanol terminated polysiloxane has the formula,

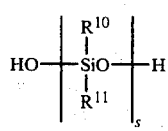

where $R^{10}$ and $R^{11}$ are independently selected from monovalent hydrocarbon radicals and s varies such that the polymer has a viscosity varying from 5 to 1,000 centipoise at 25° C. a silanol content that varies from 5 to 9 percent by weight and at a concentration of the polymer from 0.13 to 5 parts by weight.

33. The process for forming a two-component room temperature vulcanizable silicone rubber composition of claim 17 which has appropriate sag-control and appropriate work-life further comprising mixing into the composition from 0.13 to 5 parts by weight of a linear silanol terminated organopolysiloxane polymer having a viscosity varying from 5 to 1,000 centipoise at 25° C. where the organo groups are selected from monovalent hydrocarbon radicals.

34. The process for forming the two-component room temperature vulcanizable silicone rubber composition of claim 33 wherein low molecular weight silanol terminated diorganopolysiloxane polymer has the formula,

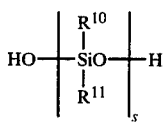

where $R^{10}$ and $R^{11}$ are independently selected from monovalent hydrocarbon radicals and s varies such that the polymer has a viscosity varying from 5 to 1,000 centipoise at 25° C. and the silanol content of the polymer varies from 5 to 9 percent by weight and wherein the concentration of the polymer varies from 0.13 to 5 parts by weight.

35. A process for sealing two glass panes together at the edges with a two-component room temperature vulcanizable silicone rubber composition comprising (i) mixing; (A) 100 parts by weight of silanol end-stopped diorganopolysiloxane of a viscosity varying from 500 to 1,800 centipoise at 25° C. where the organo group is a monovalent hydrocarbon radical; (B) at least 3 parts of fumed silica; (C) from 0.03 to 2.0 parts by weight of a polyether selected from the formulas consisting of

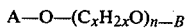

and

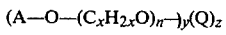

wherein A and B represent radicals selected from the class consisting of hydrogen, alkyl radicals containing from 1 to 12 carbon atoms, cyclo alkyl radicals containing 5 to 7 carbon atoms in the ring, mononuclear and binuclear aryl radicals and mononuclear aryl lower alkyl radicals wherein the alkyl groups attached to the aromatic nucleus contain a total of no more than 5 carbon atoms;

wherein R is alkyl containing from 1 to 11 carbon atoms; Q is a residue of a polyhydric initiator radical containing at least two hydroxyl radicals selected from the class consisting of ethylene glycol, glycerol, trimethylolpropane, and other polyhydric alcohols having from 2 to 6 hydroxyl groups; n is a number having a value of from 4 to 2,000; x is a number having a value of 2 to 4; y has a value of from 2 to 10; and z has a value of from 1 to 5; the polyether having a molecular weight of from about 300 to about 200,00; (D) from 1 to 15 parts by weight of a silicate of the formula,

wherein $R^5$ and $R^6$ are alkyl radicals of 1 to 8 carbon atoms and m is 0 or 1 and partial hydrolysis products thereof, and; (E) from 0.01 to 5 parts by weight of a metal salt of a carboxylic acid where the metal varies from lead to manganese in the Periodic Table; (F) at least 0.13 parts by weight of a linear low molecular weight silanol terminated diorganopolysiloxane polymer having a viscosity varying from 5 to 1,000 centipoise at 25° C. and where the organo groups are selected from monovalent hydrocarbon radicals, the polymer having a silanol content varying from 5 to 9 percent by weight; (ii) applying the composition to the edges of the glass panes to be sealed together; (iii) positioning the glass panes together with the foregoing mixture placed at the edges of the window panes so as to seal the air between the glass panes therein and (iv) allowing the composition to cure to a silicone elastomeric sealant.

36. The two-component room temperature vulcanizable silicone rubber composition of claim 32 further including from 0.1 to 5 parts by weight of a silane of the formula,

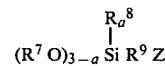

where $R^7$ is an alkyl radical of 1 to 8 carbon atoms; where $R^8$ is selected from the class consisting of alkyl radicals from 1 to 8 carbon atoms, vinyl radicals and phenyl radicals; $R^9$ is a divalent hydrocarbon radical of 2 to 15 carbon atoms; Z is an amine functional group and a varies from 0 to 3.

37. That two-component room temperature vulcanizable silicone rubber composition of claim 36 wherein the amine functional silane is gamma-aminopropyltriethoxysilane.

38. The process for forming the two-component room temperature vulcanizable silicone rubber composition of claim 34 wherein there is further present from 0.1 to 5 parts by weight of an amino functional silane of the formula,

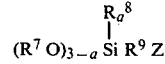

where $R^7$ is an alkyl radical of 1 to 8 carbon atoms, $R^8$ is selected from the class consisting of alkyl radicals of 1 to 8 carbon atoms, vinyl radicals and phenyl radicals, where $R^9$ is a divalent hydrocarbon radical of 2 to 15 carbon atoms and Z is an amine functional group and a varies from 0 to 3.

39. The process for forming the two-component room temperature vulcanizable silicone rubber composition of claim 38 wherein the amine functional silane is gamma-aminopropyltriethoxysilane.

40. The process of claim 35 further including (G) from 0.1 to 5 parts by weight of an amino functional silane of the formula, $$(R^7O)_{3-a}\underset{\underset{\textstyle R^8_a}{|}}{Si}R^9Z$$

where $R^7$ is an alkyl radical of 1 to 8 carbon atoms; $R^8$ is selected from the class consisting of alkyl radicals of 1 to 8 carbon atoms; vinyl radicals and phenyl radicals; $R^9$ is a divalent hydrocarbon radical of 2 to 15 carbon atoms; Z is an amine functional group and a varies from 0 to 3.

* * * * *